United States Patent
Gadepalli et al.

(10) Patent No.: US 9,800,883 B2
(45) Date of Patent: *Oct. 24, 2017

(54) PARALLEL VIDEO TRANSCODING

(71) Applicant: Google Inc., Mountain View, CA (US)

(72) Inventors: Krishna Gadepalli, Fremont, CA (US); Christophe Chaland, Sunnyvale, CA (US); Rushabh Doshi, Menlo Park, CA (US); Huisheng Wang, Palo Alto, CA (US); Wendy Tobagus, Mountain View, CA (US); Vijnan Shastri, Mountain View, CA (US); Debargha Mukherjee, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/091,777

(22) Filed: Apr. 6, 2016

(65) Prior Publication Data

US 2016/0219286 A1     Jul. 28, 2016

Related U.S. Application Data

(63) Continuation of application No. 13/185,272, filed on Jul. 18, 2011, now Pat. No. 9,338,467.

(Continued)

(51) Int. Cl.
| | |
|---|---|
| *H04N 19/40* | (2014.01) |
| *H04N 19/436* | (2014.01) |
| *H04N 19/85* | (2014.01) |
| *H04N 19/127* | (2014.01) |
| *H04N 19/14* | (2014.01) |
| *H04N 19/184* | (2014.01) |

(52) U.S. Cl.
CPC ......... *H04N 19/436* (2014.11); *H04N 19/127* (2014.11); *H04N 19/14* (2014.11); *H04N 19/184* (2014.11); *H04N 19/40* (2014.11); *H04N 19/85* (2014.11)

(58) Field of Classification Search
CPC ...... H04N 19/127; H04N 19/14; H04N 19/85; H04N 19/436; H04N 19/40; H04N 19/184
USPC .................................................... 375/240.26
See application file for complete search history.

(56) References Cited

U.S. PATENT DOCUMENTS

| | | | |
|---|---|---|---|
| 6,275,536 B1 * | 8/2001 | Chen ................ | H04N 21/23655 375/240.25 |
| 8,042,142 B1 | 10/2011 | Doshi et al. | |

(Continued)

*Primary Examiner* — Nguyen Truong
(74) *Attorney, Agent, or Firm* — Young Basile Hanlon & MacFarlane, P.C.

(57) ABSTRACT

A system and method provides transcoding a video in parallel by multiple transcoders based on a measure of video coding complexity (VCC). The system has a video preprocessing module, a master transcoder, a transcoding controller and multiple transcoders. The video pre-processing module transcodes a source video into an intermediate video. The master transcoder partitions the intermediate video into multiple transcoding units, where a transcoding unit identifies a portion of data of the intermediate video for transcoding. The master transcoder further generates a transcoding request for each transcoding unit. The transcoding controller distributes the transcoding units to the multiple transcoders, which transcode the data of the transcoding units in parallel into transcoded data.

26 Claims, 9 Drawing Sheets

Related U.S. Application Data

(60) Provisional application No. 61/365,756, filed on Jul. 19, 2010.

(56) References Cited

U.S. PATENT DOCUMENTS

| | | |
|---|---|---|
| 2005/0036543 A1 | 2/2005 | Vetro et al. |
| 2009/0245349 A1 | 10/2009 | Zhao et al. |

* cited by examiner

PARALLEL VIDEO TRANSCODING

CROSS-REFERENCE TO RELATED APPLICATIONS

This application claims is a continuation of co-pending U.S. application Ser. No. 13/185,272 filed Jul. 18, 2011, which claimed the benefit of U.S. Provisional Application No. 61/365,756, filed Jul. 19, 2010, entitled "Parallel Transcoding," both of which are incorporated by reference in their entirety.

TECHNICAL FIELD

Described embodiments relate generally to video hosting systems, and more particularly to a parallel video transcoding system based on video coding complexity.

BACKGROUND

Video hosting services such as YOUTUBE allow users to post videos. Most video hosting services transcode an original source video from its native encoded format (e.g., .MOV) into a different format (e.g., Adobe Flash or Windows Media Video (.WMV)). Transcoding comprises decoding the source video from its original format into an unencoded representation using a decoder for the original format and then encoding the unencoded representation with an encoder for the new format. Transcoding can be used to reduce storage requirements, and also to reduce the bandwidth requirements for serving the video to clients.

One challenge in designing a video coding system for video hosting services with millions of videos is to transcode and to store the videos with acceptable visual quality with reasonable transcoding latency. Transcoding a video sequentially by a dedicated video transcoder in conventional video coding systems incurs long latency and the transcoding latency increases with videos with high resolution, bit rate, frame rate, longer duration or higher quality. For example, transcoding a three-minute video to a video in high-definition (HD) format by a single video transcoder may take 30 to 35 minutes. The long transcoding latency can further delay downstream processing (e.g., video analysis, or streaming) leading to a deteriorated user experience.

Another aspect of the challenge faced by the conventional video transcoders is that source videos have a variety of coding parameters (e.g., resolution, frame rate, bitrate) and video content. However, conventional video transcoders typically ignore the impact of video content and coding complexity on transcoding. Transcoding a video without considering the impact of video content and complexity on transcoding can degrade video quality and user experience.

SUMMARY

A method, system and computer-readable medium provide parallel transcoding of videos based on video coding complexity for video hosting services.

In one embodiment, the parallel transcoding system comprises a video pre-processing module, a master transcoder, a transcoding controller and multiple transcoders. The video pre-processing module is configured to transcode a source video into an intermediate video stream, where the source video has a first video format and multiple video frames and the intermediate video stream has an intermediate video format. The master transcoder is configured to split the intermediate video stream into multiple transcoding units, where a transcoding unit identifies a portion of data of the intermediate video stream for transcoding. The master transcoder is further configured to generate a transcoding request for each transcoding unit. The transcoding controller is configured to distribute the transcoding units to the multiple transcoders, which transcode the data of the transcoding units in parallel into transcoded data in a second video format.

In another embodiment, the parallel transcoding method transcodes a source video into an intermediate video stream, where the source video has a first video format and multiple video frames and the intermediate video stream has an intermediate video format. The method splits the intermediate video stream into multiple transcoding units, where a transcoding unit identifies a portion of data of the intermediate video stream for transcoding. The method further generates a transcoding request for each transcoding unit, and distributes the transcoding units to multiple transcoders for transcoding the data of the transcoding units in parallel into transcoded data.

In yet another embodiment, a non-transitory computer-readable medium stores executable computer program code for transcoding a source video in parallel for a video hosting service. The computer-readable medium stores computer program code for transcoding a source video into an intermediate video stream, where the source video has a first video format and multiple video frames and the intermediate video stream has an intermediate video format. The computer-readable medium further stores computer program code for splitting the intermediate video stream into multiple transcoding units, where a transcoding unit identifies a portion of data of the intermediate video stream for transcoding. The computer-readable medium further stores computer program code for generating a transcoding request for each transcoding unit, and for distributing the transcoding units to multiple transcoders for transcoding the data of the transcoding units in parallel into transcoded data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

I. System Overview

Figure 1A:
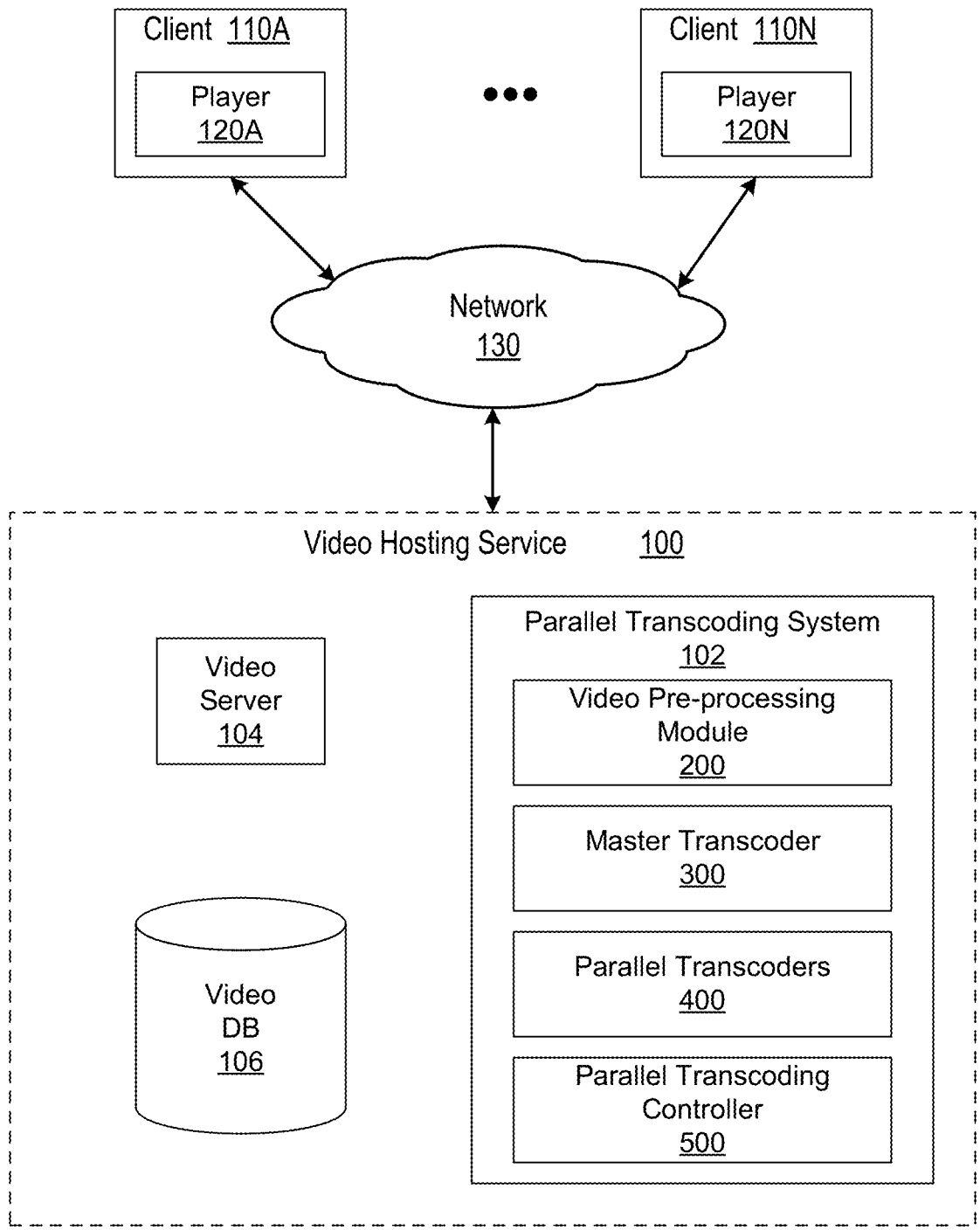
FIG. 1A is a block diagram illustrating a system view of a video hosting service having a parallel transcoding system.

FIG. 1A is a block diagram illustrating a system view of a video hosting service 100 having a parallel transcoding system 102. Multiple users/viewers use client 100 (e.g., 110A-N) to send video hosting requests to the video hosting service 100, such as uploading videos to a video hosting website, and receive the requested services from the video hosting service 100. The video hosting service 100 communicates with one or more clients 110A-N via a network 130. The video hosting service 100 receives the video hosting service requests from clients 110A-N, transcodes source videos by the parallel transcoding system 102 and returns the transcoded source videos to the clients 110A-N.

Turning to the individual entities illustrated on FIG. 1A, a client 110 is used by a user to request video hosting services. For example, a user uses a client 110 to send a request for uploading a video for sharing, or playing a video. The client 110 can be any type of computer device, such as a personal computer (e.g., desktop, notebook, or laptop) computer, as well as devices such as a mobile telephone, personal digital assistant, or IP enabled video player. The client 110 typically includes a processor, a display device (or output to a display device), a local storage, such as a hard drive or flash memory device, to which the client 110 stores data used by the user in performing tasks, and a network interface for coupling to the system 100 via the network 130.

A client 110 also has a video player 120 (e.g., 120A-N, the Flash™ player from Adobe Systems, Inc., or a proprietary one) for playing a video stream. The video player 120 may be a standalone application, or a plug-in to another application such as a network browser. Where the client 110 is a general purpose device (e.g., a desktop computer, mobile phone), the player 120 is typically implemented as software executed by the computer. Where the client 110 is dedicated device (e.g., a dedicated video player), the player 120 may be implemented in hardware, or a combination of hardware and software. All of these implementations are functionally equivalent in regards to the invention.

The network 130 enables communications between the clients 110 and the video hosting service 100. In one embodiment, the network 130 is the Internet, and uses standardized internetworking communications technologies and protocols, known now or subsequently developed that enable the clients 110 to communicate with the video hosting service 100.

The video hosting service 100 comprises a parallel transcoding system 102, a video server 104 and a video database 106. The video server 104 serves the videos from the video database 106 in response to user video hosting service requests. The video database 106 stores user uploaded videos and videos transcoded by the parallel transcoding system 102. In one embodiment, the video database 106 stores a large video corpus for the parallel transcoding system 102 to train a video coding complexity analysis model.

The parallel transcoding system 102 comprises a video pre-processing module 200, a master transcoder 300 (also referred to as "master"), a pool of parallel transcoders 400 (also referred to as "workers") and a parallel transcoding controller 500. In one embodiment, the parallel transcoding controller 500 is a separate entity from the master transcoder 300 and the parallel transcoders 400. Another embodiment of the parallel transcoding system 102 has the parallel transcoding controller 500 as a part of the master transcoder 300. Other embodiments may have multiple third-party parallel transcoders (e.g., cloud processing), where the master transcoder and the parallel transcoders are controlled by different entities.

For a source video, the video pre-processing module 200 transcodes the source video into an intermediate video stream in an intermediate video format. The master transcoder 300 splits/partitions the intermediate video stream into multiple video and audio transcoding units. A worker (i.e., one of the parallel transcoders 400) receives a transcoding unit of the intermediate video stream and transcodes the intermediate video stream to a video stream in its target video format with an optimized bitrate and visual quality based on the video coding complexity of the source video. The parallel transcoding controller 500 communicates with the master transcoder 300 and parallel transcoders 400 to control work flow between the master transcoder 300 and the parallel transcoders 400 such that the transcoding latency is kept reasonably low.

Figure 1B:
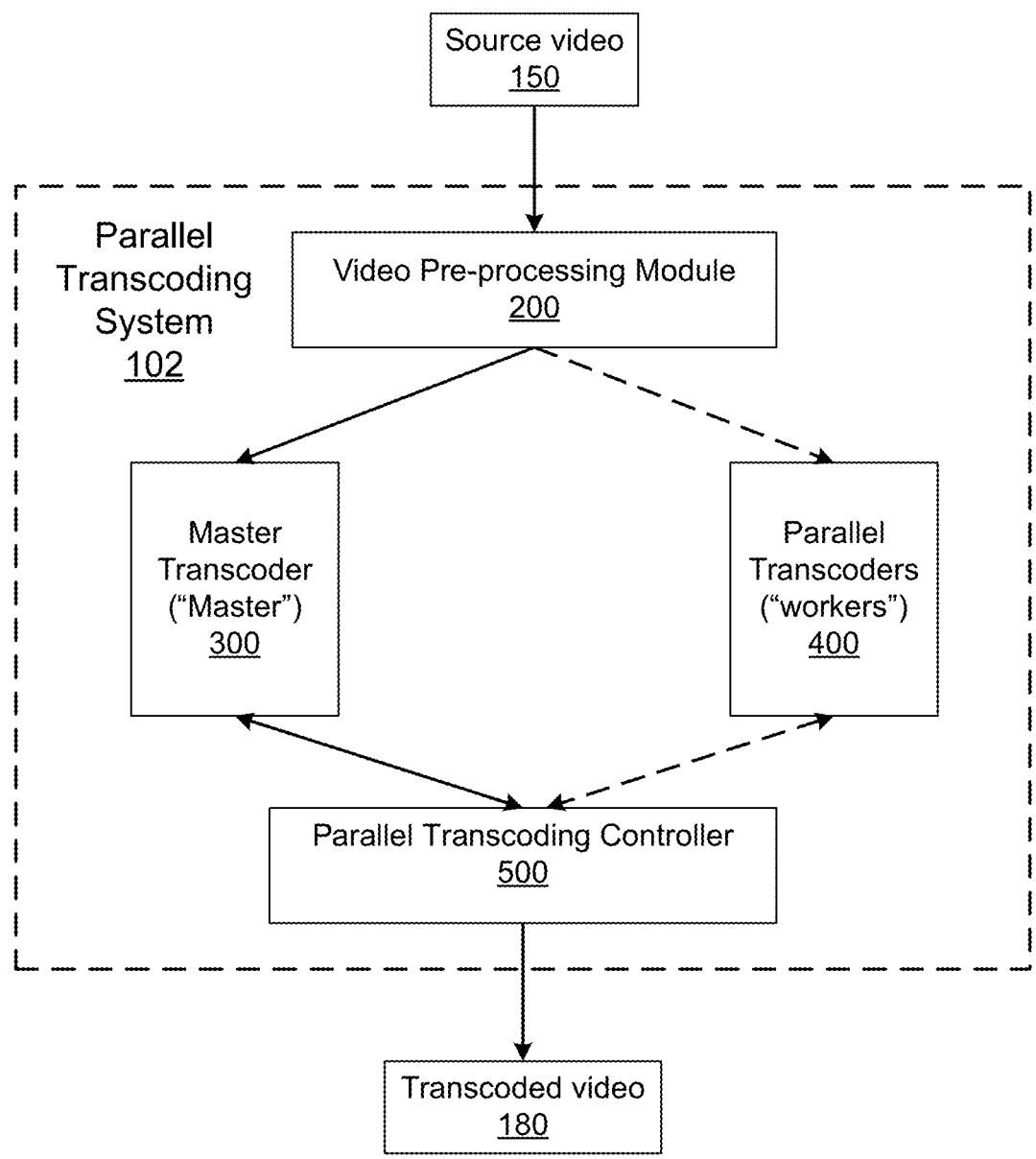
FIG. 1B is a flow diagram illustrating the parallel transcoding system within the video hosting service illustrated in FIG. 1A.

To further illustrate the system operation of the video hosting service 100, FIG. 1B is a flow diagram illustrating the parallel transcoding system 102 within the video hosting service 100 illustrated in FIG. 1A. A user of a client 110 sends a request to the video hosting service 100 for uploading a source video 150, where the source video 150 comprises multiple video frames and video data (e.g., H.263) and audio data (e.g., MP3). The video pre-processing module 200 of the parallel transcoding system 102 receives the source video 150 in its native format (e.g., Motion Picture Experts Group (MPEG)-2) and transcodes the source video 150 in its native format to an intermediate video stream in an intermediate format (e.g., flv_universal). The video pre-processing module 200 also generates a coding complexity measure (e.g., a video content complexity score) of the source video 150. The coding complexity measure of the source video 150 represents the difficulty to encode the source video 150.

The master transcoder 300 reads the intermediate video stream from the video pre-processing module 200 and splits the intermediate video stream at appropriate boundaries into multiple audio and video transcoding units (e.g., audio chunks and video chunks). The master transcoder 300 sends transcoding requests for the transcoding units to the parallel transcoding controller 500, which distributes the transcoding units to the parallel transcoders 400 for transcoding. A worker of the parallel transcoders 400 reads the requested video and/or audio chunk from the intermediate video stream, transcodes the requested video/audio chunk and notifies the parallel transcoding controller 500 when the transcoding is done. Multiple workers of the parallel transcoders 400 transcode multiple video/audio chunks of the intermediate video stream in parallel.

The parallel transcoding controller 500 keeps track of the status of each video/audio chunk and when a video/audio chunk is done, the controller 500 reads the transcoded video/audio chunk from the worker that transcodes the video/audio chunk. The master transcoder 300 checks with the controller 500 for the transcoded video/audio chunks. Responsive to a video/audio chunk being transcoded, the master transcoder 300 reads the transcoded video/audio chunk from the controller 500 and merges the transcoded video and audio chunks. Once all video/audio chunks of the intermediate video stream are transcoded, the master transcoder 300 muxes the merged video/audio chunks to create a transcoded video stream 180 in its target video format.

II. Video Coding Complexity Measurement

Varying contents in scenes captured by video sequences contain various amount of information in the video sequences. Variations in the spatial and temporal characteristics of source videos lead to different coding complexity of the source videos. Ignoring the impact of video content and coding complexity on transcoding a video sequence degrades the visual quality of the transcoded video and user experience. Using video coding complexity of a source video helps effectively transcode the source video with acceptable video quality.

Figure 2:
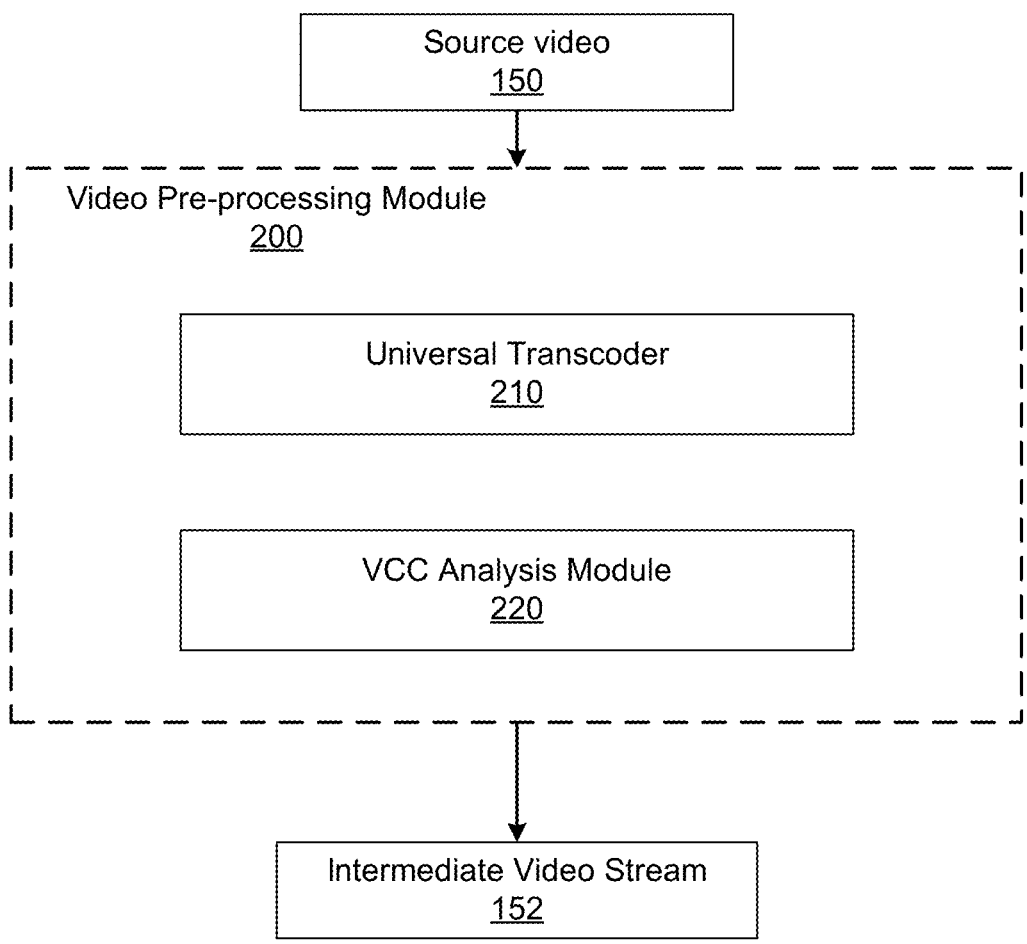
FIG. 2 is a video pre-processing module of the parallel transcoding system.

FIG. 2 illustrates one embodiment of a video pre-processing module 200 of the parallel transcoding system 102. The video pre-processing module 200 in the embodiment illustrated in FIG. 2 comprises a universal transcoder 210 and a video coding complexity (VCC) analysis module 220. The universal transcoder 220 receives a source video 150 and transcodes the source video 150 into an intermediate video stream 152. The source video 150 contains multiple video frames and each video frame can be divided into multiple blocks for block-based video coding. The VCC analysis module 210 analyzes the video coding complexity of the source video 150 and generates a measure of the video coding complexity of the source video 150.

The universal transcoder 210 is configured to transcode the source video 150 from its native format into an intermediate video stream 152 in an intermediate video format. To transcode the source video 150, the universal transcoder 210 first decodes the source video 150 to extract source video coding parameters (e.g., resolution, frame rate and bitrate) and spatial and temporal features of the source video 150. The universal transcoder 210 stores the extracted source video coding parameters and spatial and temporal features in a log file for video coding complexity analysis of the source video 150. The spatial and temporal features of the source video 150 can be frame-level and/or block-level features of the source video 150.

The universal transcoder 210 encodes the source video 150 to the intermediate videos stream 152 in an intermediate format. The intermediate format may be same as the native format or different from the native format. Practically, the universal transcoder 210 is allocated some number of coding bits as needed to encode the source video 150 such that the intermediate video stream has a close to lossless video quality. The universal transcoder 210 may include additional coding parameters (e.g., universal work load in time units of encoding the entire source video 150) into the log file for video coding complexity analysis.

For example, the universal transcoder 210 receives a source video 150 having a MPEG-2 as its native format. The universal transcoder 210 transcodes the source video 150 from its native format (e.g., MPEG-2) to an intermediate format (e.g., flv_universal) using a video encoding program (e.g., FFmpeg, a commonly used and publicly available video coding program). The universal transcoder 210 creates an FFmpeg log file for the intermediate video stream 152, where the FFmepg log file contains source video coding parameters, spatial and temporal features and length of encoding time obtained from the transcoding process.

The VCC analysis module 210 is configured to generate a measure of the coding complexity of the source video 150. The coding complexity measure of the source video 150 represents the difficulty of encoding the source video 150. In one embodiment, the video coding complexity of a source video is proportional to the amount of spatial and temporal (e.g., motion) information contained in the source video 150. For example, a large luminance variance of pixel value and/or motion-compensated luminance residual value in a video frame indicates a large spatial activity in the video frame. Extracted temporal features of a video frame, such as the length/entropy of motion vectors and energy of frame residual, represent the amount of motion present in the video frame.

The VCC analysis module 220 generates a measure of the coding complexity of the source video 150 using the spatial and/or temporal features of the source video 150. Generally, more bits needed to encode a source video indicate a more complicated source video being encoded. In other words, there is a correlation between the spatial and temporal features of a video and its corresponding encoding bitrate. In one embodiment, the VCC analysis module 220 computes a VCC score based on one or more spatial and/or temporal features of the source video 150. For example, the VCC score of the source video 150 is computed based on frame-level spatial variance, residual energy, number of skipped macroblocks (MBs) and number of bits to encode the motion vector of a predictive MB of the source video 150. Other coding parameters, such as universal workload of encoding the source video 150, can be used in VCC score calculation.

To learn the correlation between the spatial and temporal features of a video and its corresponding encoding bitrate, the VCC analysis module 220 can be trained off-line using videos selected from the video database 106 illustrated in FIG. 1A. For example, the VCC analysis module 220 is trained using a linear regression algorithm (e.g., the "regress" function provided by MatLab software) on a large video set (e.g., 20,000 videos from the video database 106). In one embodiment, the linear regression algorithm is used to model the relationship between a selected video feature and a normalized bitrate.

III. Parallel Video Transcoding

Transcoding of a video within an acceptable transcoding latency can be achieved by dividing the video into multiple transcoding units and efficiently distributing the multiple transcoding units to multiple transcoders. The parallel transcoding system 102 is configured to efficiently distribute the video transcoding tasks using the master transcoder 300 and the parallel transcoders 400 controlled by the parallel video controller 500.

Figure 3:
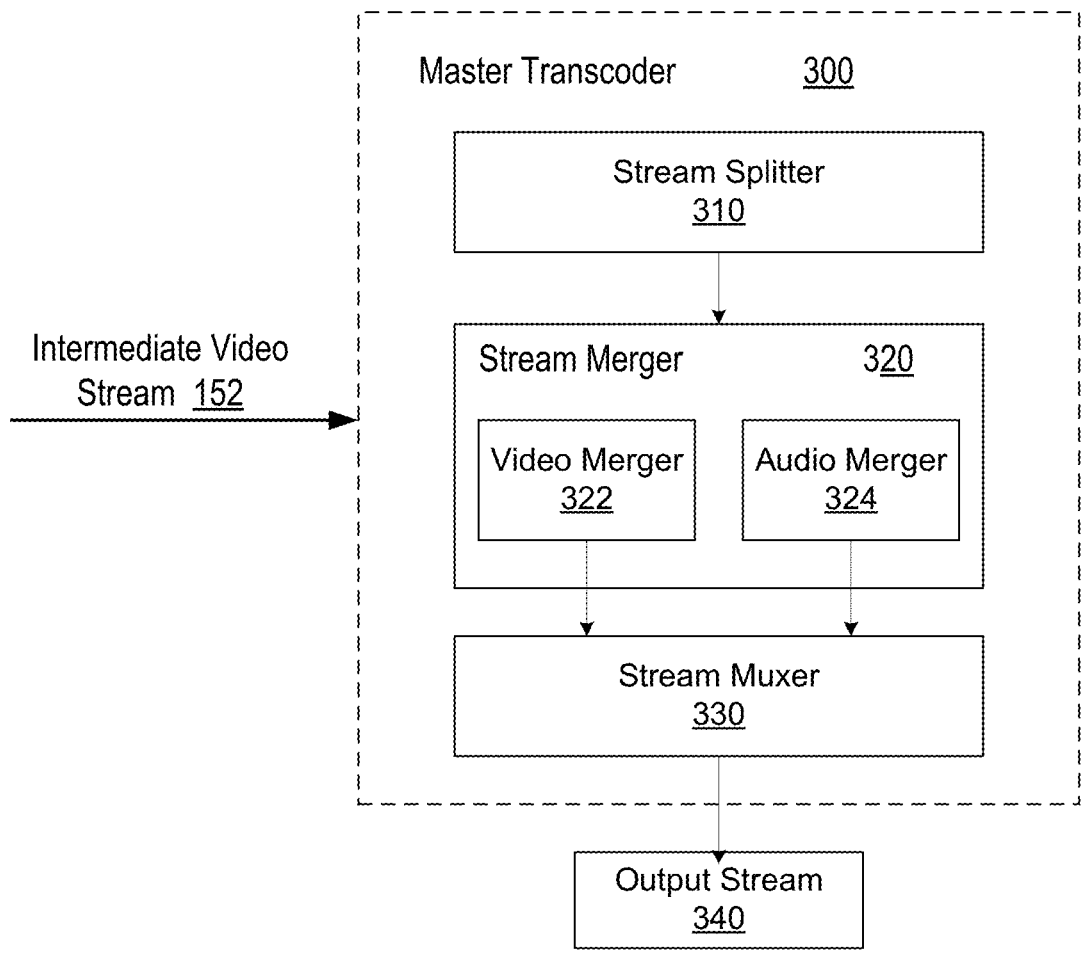
FIG. 3 is a master transcoder of the parallel transcoding system.

FIG. 3 is a master transcoder 300 of the parallel transcoding system 102. The master transcoder 300 in the embodiment illustrated in FIG. 3 comprises a stream splitter 301, a stream merger 320 and a stream muxer 330. The master transcoder 300 is configured to split the intermediate video stream 152 into multiple transcoding units at appropriate boundaries. The multiple transcoding units are efficiently distributed by the parallel transcoding controller 500 to the parallel transcoders 400. The master transcoder 300 is further configured to generate an output video stream 340 from the transcoded video/audio data by the parallel transcoders 400.

The steam splitter 310 of the master transcoder 300 receives the intermediate video stream 152 from the video pre-processing module 200 and splits the intermediate video stream 152 into multiple transcoding units at the appropriate boundaries. For example, the stream splitter 310 splits the video data of the intermediate video stream 152 into a sequence of video chunks. A video chunk is a portion of the video data of the intermediate video stream 152 and the video chunk constitutes a video transcoding unit. A video chunk is identified by a unique chunk identification (e.g., v_id_123) and the identification for a subsequent video chunk in the sequence of the video chunks is incremented by a fixed amount (e.g., v_id_124). In one embodiment, transcoding the audio data of a source video is optional. If the audio data of a source video is transcoded, the stream splitter 310 splits the audio data of the intermediate video stream 152 into a sequence of audio chunks. An audio chunk is a portion of the audio data of the intermediate video stream 152 and the audio chunk constitutes an audio transcoding unit. An audio chunk is identified by a unique chunk identification (e.g., a_id_456).

The stream splitter 310 can split the intermediate video stream 152 in a variety of ways. Taking video transcoding as an example, the stream splitter 310 splits the intermediate video stream 152 into fix sized video chunks. For example, every 15 seconds of the video data of the intermediate video stream 152 form a video chunk. In another embodiment, the stream splitter 310 splits the intermediate video stream 152 into variable sized video chunks based on the video coding complexity score of the source video 150. For example, the first 5 seconds of the video data of the intermediate video stream 152 contain complex video data (e.g., a football match) and the subsequent 20 seconds of the video data are simple and static scenes (e.g., green grass of the football field). The first 5 seconds of the intermediate video stream 152 form a first video chunk and the subsequent 20 seconds of the intermediate video stream 152 make a second video chunk.

The stream splitter 310 can also split the video data of the intermediate video stream at fixed boundaries. For example, the stream splitter 310 splits the video data at the intra (I) frame boundaries of the intermediate video stream 152. To avoid sub-optimal rate control across video chunk boundaries, the stream splitter 310 splits the video data into video chunks, each of which contains at least one or more groups of pictures (GOPs) of the video data of the intermediate video stream 152.

Similarly, the stream splitter 310 can split the audio data of the intermediate video stream 152 into multiple audio chunks. Audio data of a video stream is normally sampled at a very high frequency (e.g., 48 kHz) and no interframe compression is required (e.g., MP3 audio data). Further, comparing with computationally expensive video data transcoding due to complex video processing (e.g., motion estimation and compensation), audio transcoding can be much cheaper. In one embodiment, the audio chunks of the intermediate video stream 152 are much bigger than the video chunks of the intermediate video stream 152. In another embodiment, the audio data of the intermediate video stream 152 is not split and the entire audio data is treated as one audio chunk.

The stream splitter 310 communicates with the parallel transcoding controller 500 to request transcoding a transcoding unit of data. For transcoding a video chunk, the transcoding request includes the type of the data (i.e., video chunk), the chunk identification, size of the video chunk, byte offset with respect to the start of the video data of the intermediate video stream 152, a timestamp offset of the first video packet of this video chunk and a target video format. Similarly, a request for transcoding an audio chunk may contain the type of the data (i.e., audio chunk), the chunk identification, size of the audio chunk, byte offset with respect to the start of the audio data of the intermediate video stream 152, a timestamp offset of the first audio packet of this audio chunk and a target audio format.

The steam merger 320 of the master transcoder 300 receives multiple transcoded video/audio chunks from the parallel transcoding controller 500 and merges the multiple transcoded video/audio chunks into a merged video stream. The stream merger 320 in the illustrated embodiment comprises a video merger 322 for merging video data and an optional audio merger 324 for merging audio data. If the audio data of the intermediate video stream 152 is not split, the audio merger 324 is not required to generate the merged audio data.

Taking video data as an example, the video merger 322 receives multiple transcoded video chunks from the parallel transcoding controller 500 and merges the video chunks into a merged video stream. Specifically, for each transcoded video chunk, the video merger 322 detects whether the video chunk is first video chunk. Responsive to a transcoded video chunk being a first video chunk, the video merger 322 keeps video header information inserted by a worker of the parallel transcoders 400 during transcoding. For a non-first video chunk, the video merger 322 strips the video header information inserted during transcoding. The video merger 322 combines the multiple transcoded video chunks in order, where the position of a transcoded video chunk in the merged video stream is determined by the chunk identification. For example, each transcoded video chunk in H.264 video format contains a network abstract layer (NAL) header. The video merger 322 keeps the NAL header contained in the first video chunk and strips the NAL header in subsequent video chunks.

The audio merger 324 similarly merges transcoded audio chunks into a merged audio stream if the audio data of the intermediate video stream 152 is split into multiple audio chunks. In an embodiment of simplified implementation, the audio data of the intermediate video stream 152 is not split into multiple audio chunks, and the audio merger 324 simply outputs the entire transcoded audio data to the stream muxer 330.

The stream muxer 330 of the master transcoder 300 combines the merged video data and audio data to generate an output video stream. The stream muxer 330 is a stream multiplexer that receives multiple video and audio data and outputs a single video stream. The output video stream (e.g., the transcoded video 180 in FIG. 1B) contains multiple video frames in a specified target video format. In one embodiment, the stream muxer 330 is combined with the stream merger 320 into a single processing unit, which is responsible for merging multiple transcoded video and/or audio chunks into the output video stream.

Figure 4:
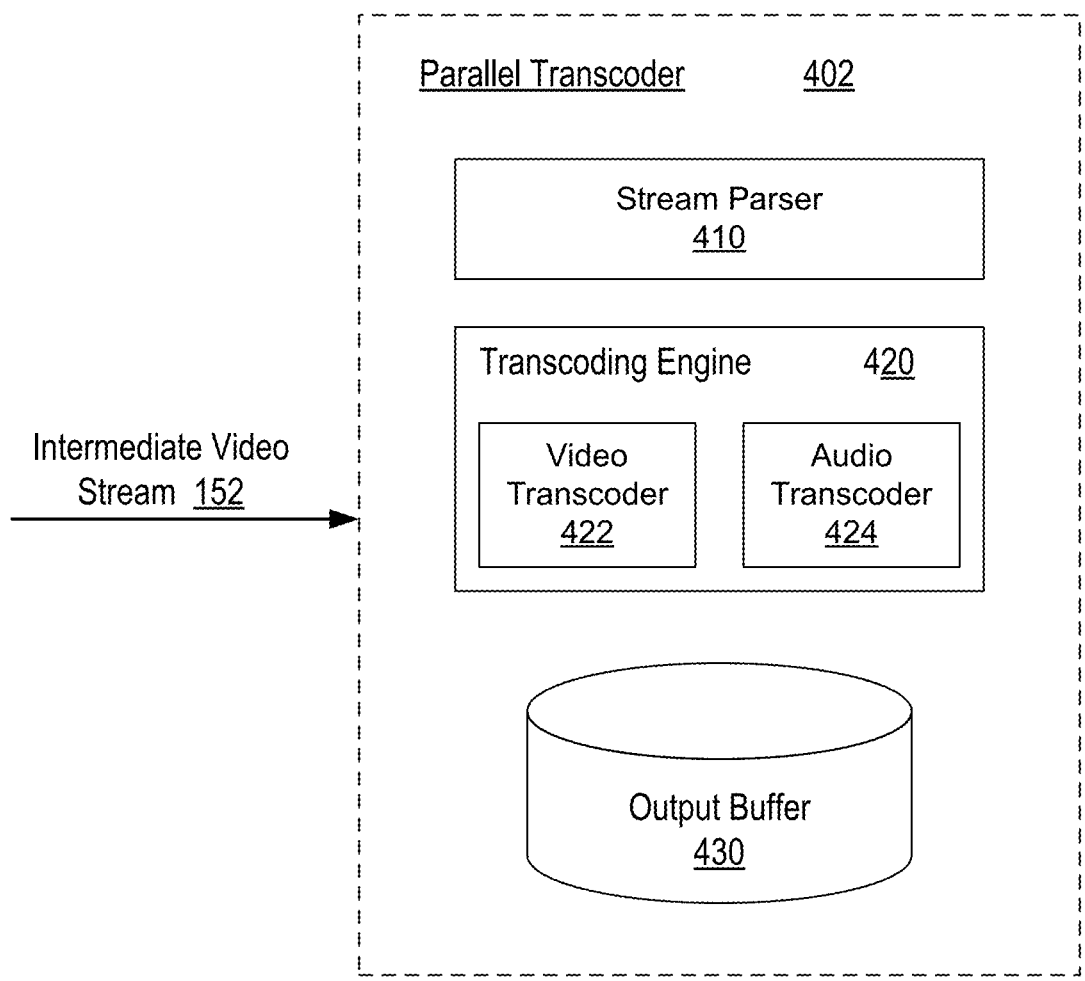
FIG. 4 is an example transcoder of multiple parallel transcoders of the transcoding system.

FIG. 4 is an example parallel transcoder (i.e., a worker) 402 of the parallel transcoders 400. The worker 402 comprises a stream parser 410, a transcoding engine 420 and an output buffer 430. The transcoding engine 420 comprises a video transcoder 422 and an audio transcoder 424. The worker 402 receives a transcoding request for transcoding a chunk of data (e.g., a video chunk or an audio chunk) from the parallel transcoding controller 500 and transcodes the chunk of data into a video/audio stream in its target video/audio format.

The stream parser 410 receives a transcoding request from the parallel transcoding controller 500 for transcoding a chunk of data. Taking a video chunk as an example, the transcoding request includes the type of the data (i.e., video chunk), the chunk identification, size of the video chunk, byte offset of the video data, a timestamp offset of the first video packet of this video chunk and the target video format. The stream parser 410 uses the chunk identification and byte offset associated with the video chunk to read the video data from the intermediate video stream 152. The stream parser 401 creates a video file from the obtained video data such that the video transcoder 422 can transcode the video file into an output video stream in its target video format.

The video transcoder 422 of the transcoding engine 420 receives the video file of the requested video chunk and transcodes the video file from its intermediate video format to its target video format. The video transcoder 422 can use any existing video transcoding schemes known to those of ordinary skills in the art.

For example, a requested video chunk of the intermediate video stream 152 is in flv_universal video format (an example flash video format). The stream parser 410 is a flash video parser (e.g., FLVParser) for a flash video transcoder. The flash video parser uses the identification of the requested video chunk to read an amount of video data starting at the byte offset from the start of the video data, where the amount of data is determined by the size of the requested video chunk. The flash video parser adds a FLV-Header to the obtained video data to create a valid FLV file for transcoding by the flesh video transcoder.

The parallel transcoding controller 500 communicates with the master transcoder 300 and the parallel transcoders 400 to distribute the transcoding requests from the master transcoder 300 to one or more parallel transcoders 400 such that the transcoding process is performed with reasonable transcoding latency.

In one embodiment, the parallel transcoding controller 500 has a state machine which tracks each transcoding request from the master transcoder 300 and status of each video/audio chunk transcoded by a worker of the parallel transcoders 400. The parallel transcoding controller 500 sends the received transcoding request to a worker of the parallel transcoder 400 for transcoding. For each video/audio chunk transcoded by a worker of the parallel transcoders 400, the parallel transcoding controller 500 reads the transcoded data from the output buffer 430 and stores the transcoded data in a storage unit (e.g., memory local to the controller 500). The parallel transcoding controller 500 notifies the master transcoder 300 responsive to a video/audio chunk transcoded by a worker of the parallel transcoders 400.

The parallel transcoding controller 500 runs a scheduling algorithm to distribute multiple transcoding requests to the parallel transcoders 400. For example, the parallel transcoding controller 500 uses a Round Robin scheduling algorithm to distribute the transcoding requests. Due to varying video content of video chunks, workers of the parallel transcoders 400 may have different processing time and bandwidth. The parallel transcoding controller 500 may use a VCC-based scheduling algorithm to reduce the transcoding latency. The VCC-based scheduling is further described with reference to FIG. 7 and FIG. 8.

Figure 5:
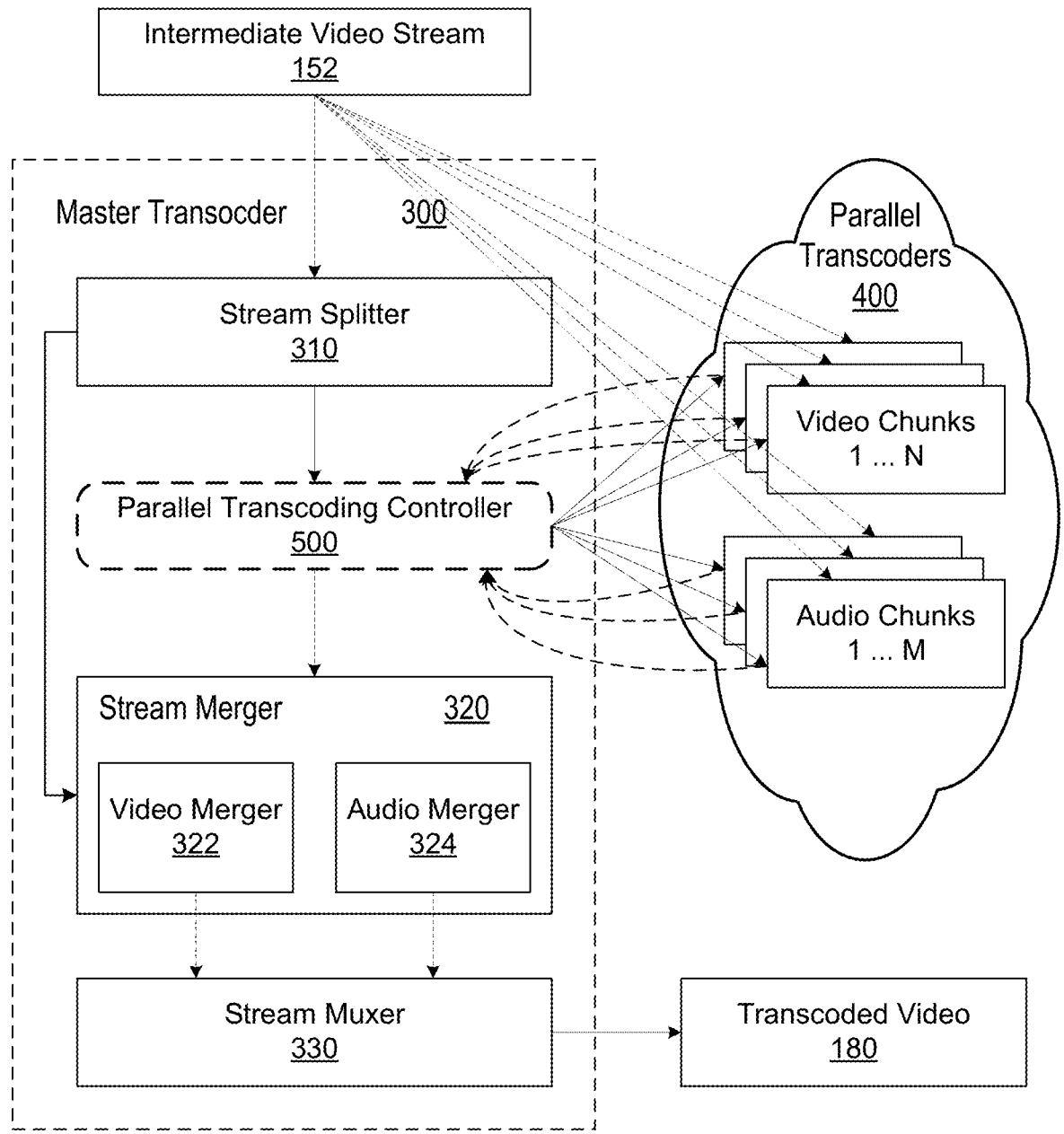
FIG. 5 is a flow diagram illustrating the inactions among the master transcoder, multiple parallel transcoders and a parallel transcoding controller for parallel video transcoding.

FIG. 5 is a flow diagram illustrating the interactions among the master transcoder 300, multiple parallel transcoders 400 and a parallel transcoding controller 500 for parallel video transcoding. In the embodiment illustrated in FIG. 5, the parallel transcoding controller 500 is located within the master transcoder 300. Other embodiments may have the parallel transcoding controller 500 as a separate entity.

The master transcoder 300 receives an intermediate video stream 152 in an intermediate video format and splits the intermediate videos stream 152 by the stream splitter 310 into N video chunks and M audio chunks, where N and M are positive integers. The number of video chunks (N) need not be same as the number of audio chunks (M) and, in one embodiment, M is smaller than N (e.g., M can be 1 indicating the audio data of the intermediate video stream 152 was not split into chunks). For each video/audio chunk, the stream splitter 310 generates a transcoding request, where the transcoding request includes multiple transcoding parameters associated with the video/audio chunk (e.g., chunk data type, chunk identification and byte offset). The stream splitter 310 sends the transcoding requests to the parallel transcoding controller 500 for distribution. The stream splitter 310 may send the transcoding parameters associated with each transcoding request to the stream merger 302 for merging transcoded video/audio data.

The parallel transcoding controller 500 distributes all requests for transcoding video chunks to one or more workers of the parallel transcoders 400. Similarly, the parallel transcoding controller 500 distributes all requests for transcoding audio chunks to one or more workers of the parallel transcoders 400. Each worker of the parallel transcoders 400 responsible for a transcoding request reads video/audio data from the intermediate video stream 152 based on the transcoding parameters associated with the transcoding request and transcodes the video/audio data into a target video format specified in the transcoding request. Responsive to finishing transcoding a video/audio chunk, the worker of the parallel transcoders 400 notifies the parallel transcoding controller 500.

The parallel transcoding controller 500 reads the transcoded video/audio data from the workers of the parallel transcoders 400 and notifies the stream merger 320 of the master transcoder 300. The video merger 322 of the stream merger 320 reads the transcoded video data from the parallel transcoding controller 500 and merges the video data into a merged video stream. Similarly, the audio merger 324 of the stream merger 320 reads the transcoded audio data from the parallel transcoding controller 500 and merges the audio data into a merged audio stream. The stream merger 320 communicates with the stream muxer 330 to generate a transcoded video 180 in its target video format from the merged video and audio data. The stream merger 320 may be combined with the stream muxer 330 as a single entity to merge transcoded video and audio data and to generate the transcoded video 180.

Figure 6:
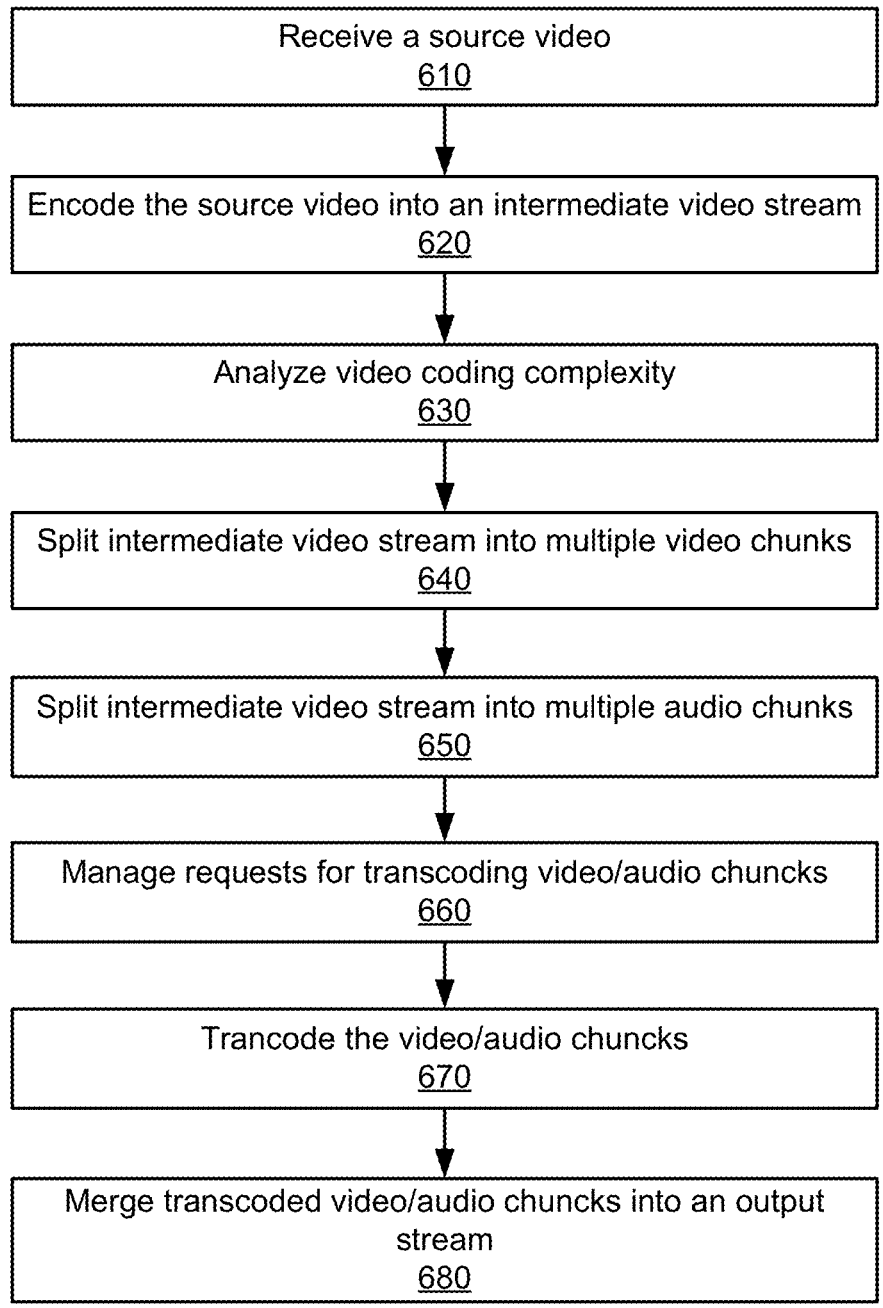
FIG. 6 is a flow chart of transcoding a video sequence using the parallel transcoding system.

FIG. 6 is a flow chart of transcoding a video sequence using the parallel transcoding system 102. Initially, the video pre-processing module 200 of the parallel transcoding system 102 receives a source video for transcoding 610. The video pre-processing module 200 transcodes the source video into an intermediate video stream 620. The video pre-processing module 200 analyzes the video coding complexity of the source video 630. The master transcoder of the parallel transcoding system 102 splits the video data of the intermediate video stream into multiple video chunks 640 and optionally splits the audio data of the intermediate video stream into multiple audio chunks 650. For each video/audio chunk, the master transcoder 300 generates a transcoding request and sends the request to the parallel transcoding controller 500. The parallel transcoding controller 500 distributes the transcoding requests to one or more workers of the parallel transcoders 400 for transcoding 660. The parallel transcoders 400 transcode the video/audio chunks in parallel and notifies the parallel transcoding controller 500 when finishing transcoding a video/audio chunk 670. The master transcoder 300 merges transcoded video/audio chunks into an output stream in its target video format 680.

IV. Multi-Pass Parallel Transcoding

Figure 7:
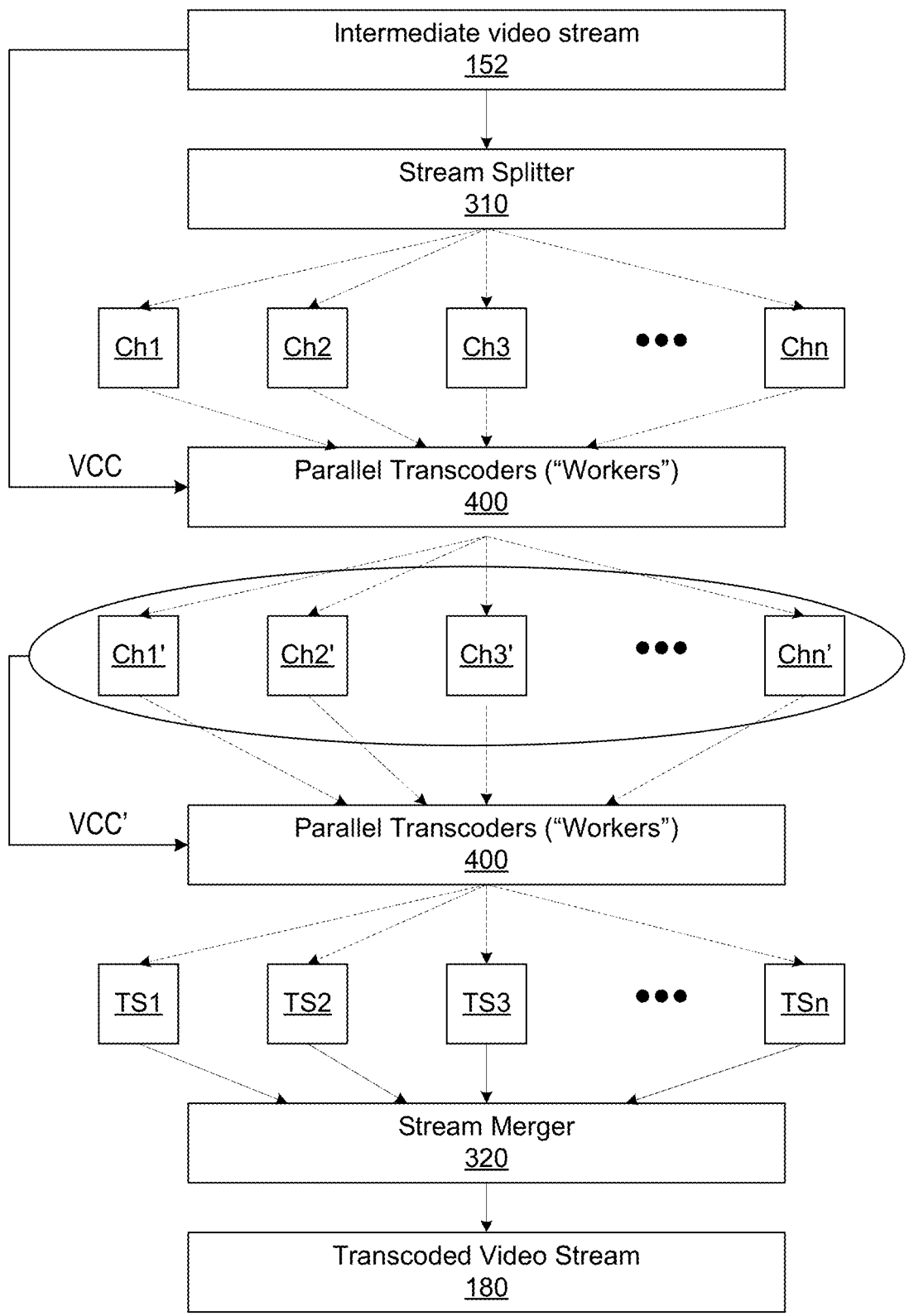
FIG. 7 is an example flow diagram of a two-pass parallel transcoding of a video sequence using the parallel transcoding system.
Figure 8:
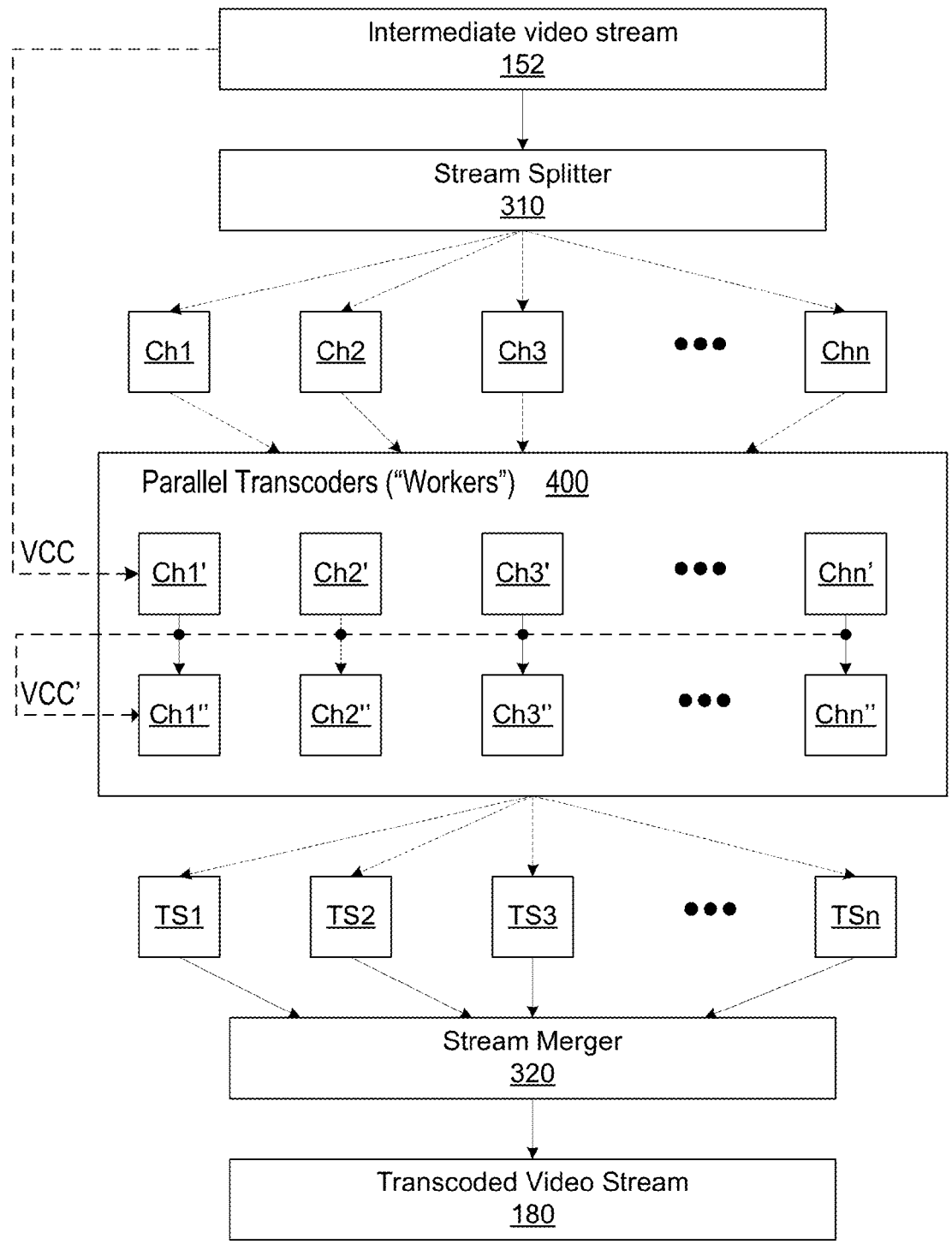
FIG. 8 is another example flow diagram of a two-pass parallel transcoding of a video sequence using the parallel transcoding system.

Having multiple transcoders asynchronously process multiple video/audio chunks needs of a source video to consider varying coding complexity among the multiple video/audio chunks for optimal bits allocation to the multiple transcoders. The parallel transcoding system 102 may transcode a video stream multiple times using video coding complexity data to generate a transcoded video stream in its target video format and target bitrate. FIG. 7 and FIG. 8 are two example flow diagrams of two-pass parallel transcoding of a video sequence using the parallel transcoding system 102.

In the example flow illustrated in FIG. 7, the stream splitter 310 of the master transcoder 300 receives an intermediate video stream 152 generated from a source video and splits the video stream 152 into a first sequence of video/audio chunks (i.e., ch1, ch2, chn). Taking video data as an example, in a first pass of transcoding, the workers of the parallel transcoders 400 transcode the multiple video chunks using the number of bits allocated to the video chunks based on a video coding complexity measure (e.g., VCC score) of the source video. Generally, a complex video chunk gets more bits allocated than a less complex video chunk. The workers of the parallel transcoders 400 can start first pass transcoding immediately after a video chunk from the stream splitter is ready for transcoding.

Similar to the video coding complexity measure described with reference to the VCC analysis module 220, the first pass transcoding also generates a video coding complexity measure (i.e., VCC') from the first pass transcoding. Alternatively, VCC' score can be computed after the first transcoding is completed. The VCC' score (i.e., a coding complexity measure for the second transcoding pass) can be a coding complexity of the entire transcoded video stream or a coding complexity measure for each video chunk. A coding complexity measure (e.g., a VCC score) for a video chunk represents the coding complexity of coding the video chunk. Based on the coding complexity measure for each chunk, a number of bits are allocated to code the video chunk. In one embodiment, to smooth out quality or bitrate variation of neighboring video chunks (i.e., multiple video chunks in sequence), the coding complexity measure for the neighboring video chunks can be normalized or averaged for allocating bits to the neighboring video chunks.

After each video chunk of the first pass transcoding is finished, the master transcoder 300 generates a first transcoded target video stream. Based on the VCC' from the first pass transcoding, the master transcoders 300 splits the first transcoded target video stream into a second sequence of video chunks (i.e., ch1', ch2', chn'). Depending on the VCC', the number of the second sequence of video chunks may be smaller or larger than the number of the first sequence of video chunks.

The workers of the parallel transcoders 400 transcode the second sequence of video chunks in a second pass of transcoding. A worker of a video chunk in the second pass of transcoding uses a number of bits allocated to the video chunk based on the coding complexity measure (VCC') from the first pass of transcoding. The results of the second pass transcoding are multiple transcoded video chunks (TS1, TS2, . . . TSn). The stream merger 320 merges the transcoded video chunks to generate a final transcoded video stream 180 in its target video format and target bitrate.

FIG. 8 is another example flow diagram of a two-pass parallel transcoding of a video sequence using the parallel transcoding system 102. Similar to the two-pass transcoding illustrated in FIG. 7, the parallel transcoding system 102 transcodes the intermediate video stream 152 twice using the coding complexity data of the source video. Different from the two-pass transcoding in FIG. 7, where the second pass transcoding starts only after all video chunks are transcoded by the first pass transcoding, a second pass transcoding of a video chunk in FIG. 8 starts immediately after that video chunk is transcoded by a worker of the parallel transcoders 400.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by real time network operating systems.

The invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will be apparent to those of skill in the, along with equivalent variations. In addition, the invention is not described with primary to any particular programming language. It is appreciated that a variety of programming languages may be used to implement the teachings of the invention as described herein, and any reference to specific languages are provided for disclosure of enablement and best mode of the invention.

The invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the following claims.

What is claimed is:

1. A system for transcoding a source video in parallel, the system comprising:
    a non-transitory computer-readable medium storing executable computer modules; and
    a processor configured to execute a master transcoder and a plurality of transcoders stored in the non-transitory computer-readable medium, wherein
    the master transcoder partitions an intermediate video generated from the source video into a plurality of transcoding units, a transcoding unit identifying a portion of data of the intermediate video for transcoding and having one or more transcoding parameters,
    the plurality of transcoders transcode the portion of data of the plurality of transcoding units in parallel into transcoded data, the transcoded data having a second video format, and
    the master transcoder further merges the transcoded data of the plurality of transcoding units into a merged video stream.

2. The system of claim 1, further comprising a pre-processing module that transcodes the source video into the intermediate video, the source video having a first video format and a plurality of video frames, and the intermediate video having an intermediate video format.

3. The system of claim 2, wherein the pre-processing module further determines a video coding complexity measure of the source video based on one or more features of the source video, wherein the video coding complexity measure represents a measure of difficulty to code the source video.

4. The system of claim 1, wherein the master transcoder partitions the intermediate video into variable sized transcoding units based on video coding complexity measure of the source video.

5. The system of claim 1, wherein the transcoding parameters of a transcoding unit include an identification of the transcoding unit, a type of the transcoding unit, a size of the transcoding unit, a byte offset to a start of the intermediate video and a timestamp of the transcoding unit.

6. The system of claim 1, wherein merging the transcoded data of the plurality of transcoding units into a merged video stream comprises:
    for each transcoding unit of the plurality of transcoding units:
        determining whether the transcoding unit is a first transcoding unit of the plurality of transcoding units ordered based on timestamps of the transcoding units;
        responsive to the transcoding unit not being the first transcoding unit of the plurality of transcoding units, removing video header information from the transcoded data; and
        combining the transcoded data of the plurality of transcoding units into the merged video stream.

7. The system of claim 1, wherein the plurality of transcoders transcode the intermediate video in multiple transcoding passes, wherein a video coding complexity measure is associated with each transcoding pass, and a subsequent video coding complexity is updated based on a result of a previous transcoding pass.

8. The system of claim 1, wherein the plurality of transcoders transcode the intermediate video twice, the video coding complexity measure of a second transcoding pass is updated based on a result of a first transcoding pass.

9. The system of claim 8, wherein
    the master transcoder splits a first transcoded target video stream generated from a first transcoding pass into a second plurality of transcoding units based on the video coding complexity measure of the second transcoding pass; and
    the plurality of transcoders transcode the data of the second plurality of transcoding units in parallel into transcoded data.

10. The system of claim 9, wherein a number of the second plurality of transcoding units is different from a number of the plurality of transcoding units associated with the first transcoding pass.

11. A computer-implemented method for transcoding a source video in parallel, the method comprising:
    partitioning an intermediate video generated from the source video into a plurality of transcoding units, a transcoding unit identifying a portion of data of the intermediate video for transcoding and having one or more transcoding parameters;
    transcoding the data of the plurality of transcoding units in parallel into transcoded data, the transcoded data having a second video format; and
    merging the transcoded data of the plurality of transcoding units into a merged video stream.

12. The method of claim 11, further comprising
    transcoding the source video into the intermediate video, the source video having a first video format and a plurality of video frames, and the intermediate video having an intermediate video format.

13. The method of claim 12, further comprising:
determining a video coding complexity measure of the source video based on one or more features of the source video, wherein the video coding complexity measure represents a measure of difficulty to code the source video.

14. The method of claim 11, further comprising partitioning the intermediate video into variable sized transcoding units based on video coding complexity measure of the source video.

15. The method of claim 11, wherein the one or more transcoding parameters of a transcoding unit include an identification of the transcoding unit, a type of the transcoding unit, a size of the transcoding unit, a byte offset to a start of the intermediate video and a timestamp of the transcoding unit.

16. The method of claim 11, wherein merging the transcoded data of the plurality of transcoding units into a merged video stream comprises:
for each transcoding unit of the plurality of transcoding units:
determining whether the transcoding unit is a first transcoding unit of the plurality of transcoding units ordered based on timestamps of the transcoding units;
responsive to the transcoding unit not being the first transcoding unit of the plurality of transcoding units, removing video header information from the transcoded data; and
combining the transcoded data of the plurality of transcoding units into the merged video stream.

17. The method of claim 11, further comprising transcoding the intermediate video in multiple transcoding passes, wherein a video coding complexity measure is associated with each transcoding pass, and a subsequent video coding complexity is updated based on a result of a previous transcoding pass.

18. The method of claim 11, further comprising transcoding the intermediate video twice, the video coding complexity measure of a second transcoding pass is updated based on a result of a first transcoding pass.

19. The method of claim 18, wherein transcoding the intermediate video twice comprises:
splitting a first transcoded target video stream generated from a first transcoding pass into a second plurality of transcoding units based on the video coding complexity measure of the second transcoding pass; and
transcoding the data of the second plurality of transcoding units in parallel into transcoded data.

20. The method of claim 19, wherein a number of the second plurality of transcoding units is different from a number of the plurality of transcoding units associated with the first transcoding pass.

21. A non-transitory computer-readable medium storing executable computer program instructions for transcoding a source video in parallel, the executable computer program instructions comprise instructions for:
partitioning an intermediate video generated from the source video into a plurality of transcoding units, a transcoding unit identifying a portion of data of the intermediate video for transcoding and having one or more transcoding parameters;
transcoding the data of the plurality of transcoding units in parallel into transcoded data, the transcoded data having a second video format; and merging the transcoded data plurality of transcoding units into a merged video stream.

22. The computer-readable medium of claim 21, further comprising computer program instructions for:
determining a video coding complexity measure of the source video based on one or more features of the source video, wherein the video coding complexity measure represents a measure of difficulty to code the source video.

23. The computer-readable medium of claim 21, wherein the transcoding parameters of a transcoding unit include an identification of the transcoding unit, a type of the transcoding unit, a size of the transcoding unit, a byte offset to a start of the intermediate video and a timestamp of the transcoding unit.

24. The computer-readable medium of claim 21, wherein the executable computer program instructions for merging the transcoded data of the plurality of transcoding units into a merged video stream comprise instructions for:
for each transcoding unit of the plurality of transcoding units:
determining whether the transcoding unit is a first transcoding unit of the plurality of transcoding units ordered based on timestamps of the transcoding units;
responsive to the transcoding unit not being the first transcoding unit of the plurality of transcoding units, removing video header information from the transcoded data; and
combining the transcoded data plurality of transcoding units into the merged video stream.

25. The computer-readable medium of claim 21, further comprising computer program instructions for transcoding the intermediate video twice, the video coding complexity measure of a second transcoding pass is updated based on a result of a first transcoding pass.

26. The computer-readable medium of claim 25, wherein the computer program instructions for transcoding the intermediate video twice comprise instructions for:
splitting a first transcoded target video stream generated from a first transcoding pass into a second plurality of transcoding units based on the video coding complexity measure of the second transcoding pass; and transcoding the data of the second plurality of transcoding units in parallel into transcoded data.

* * * * *